Oct. 15, 1929.  H. M. REINER  1,732,028

INSECT REPELLENT

Original Filed Sept. 24, 1927

Inventor

Harry M. Reiner.

By F. V. Winters

Attorney

Patented Oct. 15, 1929

1,732,028

UNITED STATES PATENT OFFICE

HARRY M. REINER, OF NEW YORK, N. Y., ASSIGNOR TO REINER PRODUCTS, INC., OF NEW YORK, N. Y., A CORPORATION OF NEW YORK

INSECT REPELLENT

Application filed September 24, 1927, Serial No. 221,758. Renewed March 12, 1929.

This invention relates to improvements in insect repellents and is offered as a substitute to the less convenient method of spraying or applying a liquid about the body of an individual or temporarily saturating the air contiguous thereto.

The invention has for its primary object the provision of a neat and attractive device, simple in construction, which is adapted to contain a quantity of diffusible liquid emitting vapors obnoxious and repelling to insects, such as flies, mosquitoes, or the like.

As will presently appear the device comprises a pair of telescopic members, in rotative relation, and adapted to present a series of registering apertures or ports from which the vapors may issue into the surrounding air.

The invention further resides in the provision of means for removably confining a quantity of fibrous material, or the like, into which a suitable amount of liquid repellent, citronella for example, may be previously introduced.

Another object of the invention is to provide interlocking means whereby a perforated disk is maintained in fixed relation to a rotative portion of the device for placing in registration certain apertures present in the companion casing.

With these general objects in view, together with others which will appear as the description proceeds, the invention resides in the novel formation, combination and arrangement of parts, all as will be described more fully hereinafter, illustrated in the drawings and particularly pointed out in the claims.

Figure 1:
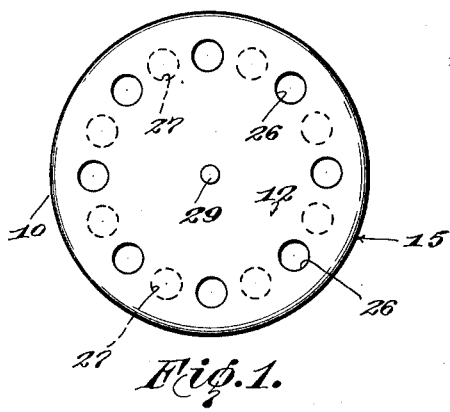
Figure 1 is a plan view of the device.
Figure 2:
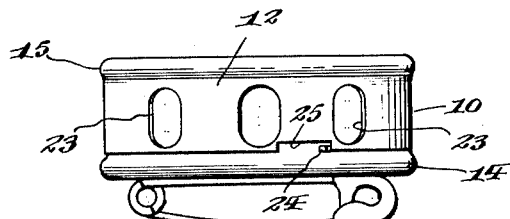
Fig. 2 is a side elevation thereof illustrating the means for attaching said device to the apparel of the individual.

Referring now in detail to the accompanying drawings, let the numeral 10 denote generally the casing of my improved device, the same comprising the lower member 11, telescopically engaged by the upper member 12, each of said members being open at the top and having their marginal edges arranged to engage the adjacent parts of the casing to facilitate the rotation thereof. In the exemplary form shown in the drawings the marginal edge 13 of said member 11 smoothly contacts the inner surface of the top of said member 12 and during the rotation of the former free and easy action is assured. The casing also includes certain refinements in the form of rounded portions 14 and 15 adjacent the faces of the said members 11 and 12, and in view of this arrangement the operator may secure a firm grip when rotating the said members and when separating them pending the addition of the liquid repellent. The members 11 and 12, constituting the casing are formed from relatively thin and light material, readily pressed to form, and in order to please the fancy of the individual certain decorations may be added to the exterior thereof. A compact and neat article is thus provided and which may be attached to the clothing of the individual by any approved fastening means 16, a safety pin for instance.

As a carrier for the liquid repellent I provide a suitable quantity of fibrous material 17, held in place in said casing by means of a resilient retainer 18, the latter being spider-like in construction and presenting a series of radial arms 19, each presenting lateral bends 20 and foot portions 21 adapted for insertion within the inner portion of the rounded rim 14 of said member 11. In view of the natural resiliency of said retainer 18, the lateral bends 20 thereof may be flexed inwardly in order to insert said foot portions 21, as aforesaid. The saturated fibrous material 17 is thus securely held in position until its removal or replacement.

As previously pointed out said members 11 and 12 are rotatively engaged in respect to each other, and in order to permit the escape of the vapors from the liquid repellent I provide the side portion of said members 11 and 12 with a series of apertures 22 and 23 respectively, which may be brought into registration by the simple expedient of slightly rotating said member 11 within said member 12, the former being provided with a stop 24, cooperating with a notch 25, for limiting the rotation of said members and positively assuring the registration of said apertures 22 and 23.

As clearly shown in Fig. 1 I also provide the top of said member 12 with a plurality of openings 26 which are adapted to be aligned with apertures 27 arranged in the disk 28 rotatively borne by said member 12, as indicated at 29.

Figure 3:
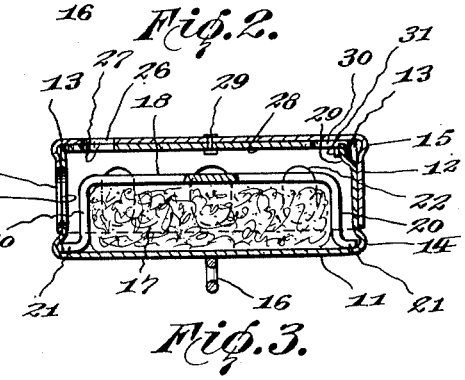
Fig. 3 is a central sectional view thereof, depicting some of the ports or apertures in registration and the means for confining the fibrous material containing the liquid repellent.
Figure 4:
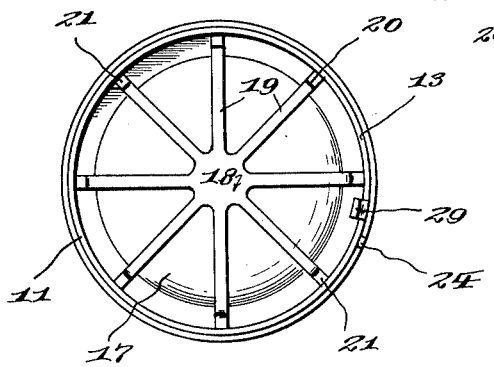
Fig. 4 is a plan view of the lower casing detached.
Figure 5:
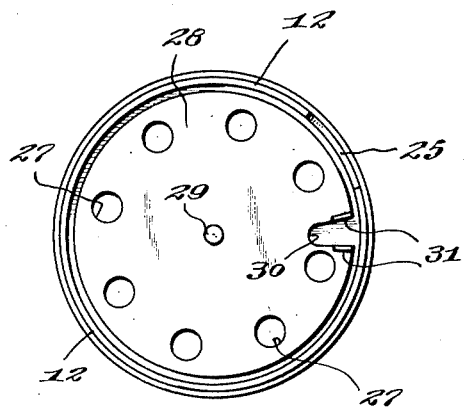
Fig. 5 is an inverted plan view of the upper casing detached.
Figure 6:
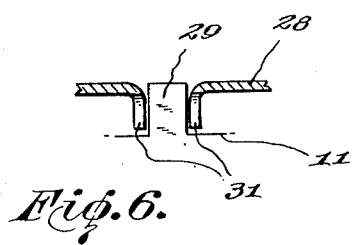
Fig. 6 is a sectional detail diagrammatically illustrating the means for locking a perforated disk to a rotative casing.

As previously mentioned said member 11 is adapted to be rotated within said member 12 in order to align the apertures 22—23, and similarly this very rotation places in registration the apertures 26—27 in said member 12 and disk 28 respectively. In order to effect this latter registration it is obviously necessary that said disk rotate with respect to said member 12 and hence a means of connection between said member 11 and said disk 28 is provided. As shown in Figs. 3 and 4, the side portion of said member 11 is provided with an inwardly directed tongue 29 and as shown in Fig. 5 said disk 28 is cut-away to provide a notch 30 presenting projections 31 arranged adjacent the peripheral edge thereof. It should now be apparent that during the assembling of members 11 and 12, said tongue 29 of the former is inserted between the projections 31 of the latter and hence movement or movements of said member 11 is readily conveyed to said disk, and since the apertures on the sides of the members and the apertures in the top of the device are positioned to align in unison, it remains only to await the abutment of stop 24 in said notch 25 to place the device in operation for expelling the vapors as aforesaid.

While my device is relatively small, the apertures arranged therein may be of large proportions in order to assure the free passage of air through the interior of the casing thereby causing a strong vaporization of the liquid repellent contained therein.

In view of the snug rotative engagement of the members 11 and 12, the casing is air-tight when the apertures are closed so that the escape of the vapors is hardly possible. However, the instant the apertures are placed in registration, as aforesaid, a quantity of vapors is diffused from the casing and into the surrounding air with the result that insects or other pests seek other places than those within the reach of said vapors.

The device is easily disassembled by uncoupling the members 11 and 12, as aforesaid, for the removal of the fibrous material, or the addition of the liquid repellent.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. A device of the character described comprising a casing, adapted to contain insect-repelling material, embodying telescopic members rotatively arranged, the side portions of each member having a series of apertures adapted to register upon the rotation thereof, the top portion of the outer member being also provided with a plurality of apertures, a perforated disk rotatively borne by said outer member in contacting relation with the apertured top portion thereof, and means for removably attaching said disk to the other member in position to effect the registration of the apertures therein with the apertures in the top of said outer member, simultaneously with the registration of the apertures in the side portions of said telescopic members.

2. A device of the character described comprising a casing, adapted to contain insect-repelling material, embodying telescopic members rotatively arranged, the side portions of each member having a series of apertures adapted to register upon the rotation thereof, the top portion of the outer member being also provided with a plurality of apertures, a perforated disk rotatively borne by the inner surface of the top of said outer member in contacting relation with the apertured top portion thereof, and means for removably attaching said disk to the other member in position to effect the registration of the apertures therein with the apertures in the top of said outer member, simultaneously with the registration of the apertures in the side portions of said telescopic members.

In testimony whereof I affix my signature.

HARRY M. REINER.